(12) United States Patent
Cui et al.

(10) Patent No.: US 10,632,572 B2
(45) Date of Patent: Apr. 28, 2020

(54) WELD FILLER ADDITIVE AND METHOD OF WELDING

(71) Applicant: GENERAL ELECTRIC COMPANY, Schenectady, NY (US)

(72) Inventors: Yan Cui, Greer, SC (US); Srikanth Chandrudu Kottilingam, Greenville, SC (US); David Vincent Bucci, Simpsonville, SC (US); Matthew J. Laylock, Mauldin, SC (US); Brad Vantassel, Easley, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 489 days.

(21) Appl. No.: 15/449,169

(22) Filed: Mar. 3, 2017

(65) Prior Publication Data
US 2018/0250776 A1  Sep. 6, 2018

(51) Int. Cl.
| | |
|---|---|
| *B23K 35/30* | (2006.01) |
| *B23K 9/167* | (2006.01) |
| *C22C 19/05* | (2006.01) |
| *B23K 35/02* | (2006.01) |
| *B23K 9/04* | (2006.01) |
| *B23K 26/34* | (2014.01) |
| *B23K 26/211* | (2014.01) |
| *B23K 26/323* | (2014.01) |
(Continued)

(52) U.S. Cl.
CPC .............. *B23K 35/304* (2013.01); *B23K 9/04* (2013.01); *B23K 9/167* (2013.01); *B23K 9/232* (2013.01); *B23K 26/211* (2015.10); *B23K 26/323* (2015.10); *B23K 26/34* (2013.01); *B23K 35/0255* (2013.01); *B23K 35/3033* (2013.01); *B23K 35/3046* (2013.01); *C22C 19/05* (2013.01); *C22C 19/053* (2013.01); *C22C 19/055* (2013.01); *C22C 19/056* (2013.01); *C22C 30/00* (2013.01); *B23K 2101/001* (2018.08); *B23K 2103/08* (2018.08); *B23K 2103/26* (2018.08)

(58) Field of Classification Search
CPC .... B23K 26/211; B23K 26/34; B23K 26/323; B23K 9/232; B23K 9/04; B23K 9/167; B23K 35/3033; B23K 35/304; B23K 35/3046; B23K 35/0255; C22C 19/056; C22C 19/05; C22C 19/053; C22C 19/055; C22C 30/00
See application file for complete search history.

(56) References Cited

U.S. PATENT DOCUMENTS

| | | | | |
|---|---|---|---|---|
| 6,210,635 B1 * | 4/2001 | Jackson | ............... | B23K 35/304 420/445 |
| 6,478,897 B1 * | 11/2002 | Izumida | ............... | C22C 19/055 148/428 |

(Continued)

*Primary Examiner* — Ibrahime A Abraham
*Assistant Examiner* — John J Norton
(74) *Attorney, Agent, or Firm* — McNees Wallace & Nurick LLC

(57) ABSTRACT

A method of welding using a weld filler additive and a weld filler additive are provided. The method includes the step of welding the component with a filler additive comprising a sufficient amount of each of W, Co, Cr, Al, Ti, Mo, Fe, B, C, Nb, and Ni, the component including a hard-to-weld base alloy. The method further includes the step of forming an easy-to-weld target alloy on a surface of the component from the welding.

16 Claims, 2 Drawing Sheets

(51) Int. Cl.
  *B23K 9/23*  (2006.01)
  *C22C 30/00* (2006.01)
  *B23K 103/18* (2006.01)
  *B23K 103/08* (2006.01)
  *B23K 101/00* (2006.01)

(56) References Cited

U.S. PATENT DOCUMENTS

| | | | |
|---|---|---|---|
| 2004/0076540 A1* | 4/2004 | Imano | B23K 35/3033 420/450 |
| 2011/0142712 A1* | 6/2011 | Hasselqvist | B23K 35/0261 420/443 |
| 2015/0217412 A1* | 8/2015 | Liu | B23K 35/34 428/680 |
| 2016/0326613 A1* | 11/2016 | Cui | C22C 19/055 |

* cited by examiner

WELD FILLER ADDITIVE AND METHOD OF WELDING

FIELD OF THE INVENTION

The present invention is generally directed to a weld filler and a method of welding using a weld filler. More specifically, the present invention is directed to a nickel-based weld filler and a method of welding hard-to-weld alloy using a nickel-based weld filler.

BACKGROUND OF THE INVENTION

Gas turbines for power generation systems must satisfy the highest demands with respect to reliability, power, efficiency, economy, and operating service life. Modern high-efficiency combustion turbines have firing temperatures that exceed about 2,300° F. (1,260° C.), and firing temperatures continue to increase as demand for more efficient engines continues. Many components that form the combustor and "hot gas path" turbine sections are directly exposed to aggressive hot combustion gases. The use of coatings on turbine components such as combustors, combustion liners, combustion transition pieces, combustion hardware, blades (buckets), vanes (nozzles) and shrouds is important in commercial gas turbine engines.

Superalloy, such as GTD 111 and its serial alloys, have been largely used in gas turbine industry due to their excellent mechanical properties, oxidization resistance and corrosion resistance. They, however, have poor weldability due to a tendency for liquation cracking and strain age cracking (SAC). Due to the poor weldability of GTD 111 and its serial alloys, weld filler materials have been usually selected to sacrifice mechanical properties to meet weldability requirements.

BRIEF SUMMARY OF THE INVENTION

In an exemplary embodiment, a weld filler additive is provided. The weld filler additive includes a sufficient amount of each of W, Co, Cr, Al, Ti, Mo, Fe, B, C, Nb, and Ni that forms an easy-to-weld target alloy, when welded with a hard-to-weld base alloy having Ti greater than 2% by weight and gamma prime greater than 45% volume fraction.

In another exemplary embodiment, a method of welding a component is provided. The method includes the step of welding the component with a filler additive comprising a sufficient amount of each of W, Co, Cr, Al, Ti, Mo, Fe, B, C, Nb, and Ni, the component including a hard-to-weld base alloy having Ti greater than 2% by weight and gamma prime greater than 45% volume fraction. The method further includes the step of forming an easy-to-weld target alloy on a surface of the component from the welding.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
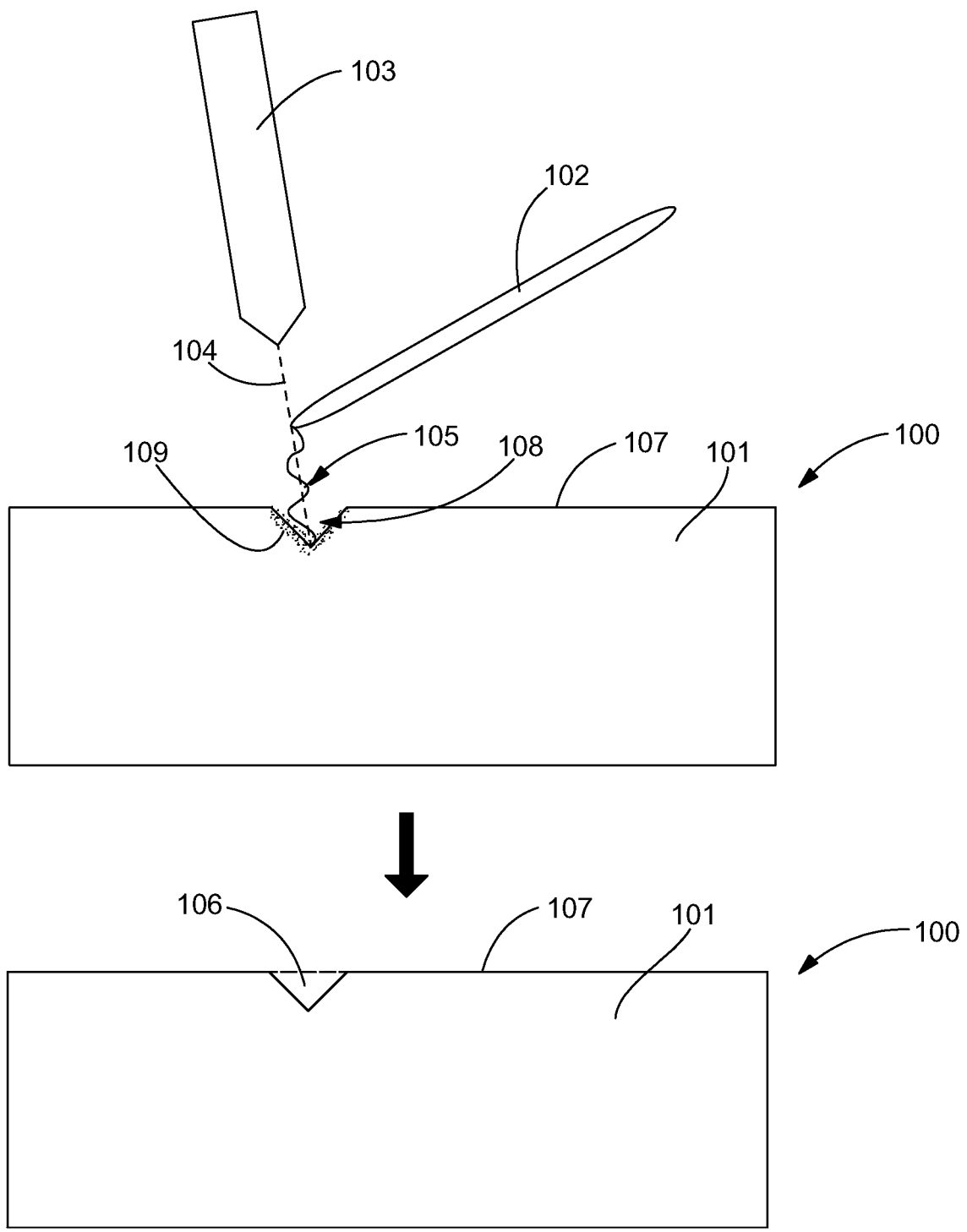
FIG. 1 illustrates a method, according to an exemplary embodiment of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "at least one," as used herein, means one or more and thus includes individual components as well as mixtures/combinations.

The term "comprising" (and its grammatical variations), as used herein, is used in the inclusive sense of "having" or "including" and not in the exclusive sense of "consisting only of."

The term "hard-to-weld alloy (and its variations)", as used herein, means an alloy, having Al %>−½Ti %+3, where Al % is weight percent of aluminum and Ti % is weight percent of titanium.

The term "easy-to-weld alloy (and its variations)", as used herein, means an alloy, having Al %≤−½Ti %+3, where Al % is weight percent of aluminum and Ti % is weight percent of titanium.

The term "buttering", as used herein, means a process of applying a weld filler additive to a hard-to-weld alloy to be transformed into an easy-to-weld alloy so that additional easy-to-weld or hard-to-weld alloy can be deposited onto the easy-to-weld alloy.

As used herein, "GTD 111" refers to an alloy including a composition, by weight, of about 3.5-4.1% tungsten, about 9-10% cobalt, about 13.7-14.3% chromium, about 2.8-3.2% aluminum, about 2.4-3.1% of tantalum, about 4.7-5.1% titanium, about 1.4-1.7% molybdenum, about 0.35% of iron, about 0.005-0.02% of boron, about 0.08-0.12% of carbon and a balance of nickel.

In one embodiment, the present invention enables a fusion weld without a crack.

With reference to FIG. 1, a component 100 is provided. The component 100 includes a hard-to-weld base alloy 101 including a surface 107 and a treatment area 108. The treatment area 108 may include a crack, defect, or area removed, machined, or otherwise prepared for treatment. In another embodiment, the hard-to-weld base alloy 101 may have a plurality of treatment area 108. An energy source 103 is placed to provide energy to melt a portion of filler additive 102 and a portion of the hard-to-weld base alloy 101. A melted portion 105 of the filler additive 102 and the hard-to-weld base alloy 101 combines in a molten mix zone 109, which solidifies to form a layer of easy-to-weld target alloy 106 to fill in the treatment area 108. The treated component 100 is crack-free weld metal and has a mechanical property of the easy-to-weld target alloy 106.

In an embodiment, the filler additive 102 may include a sufficient amount of each of W, Co, Cr, Al, Ti, Mo, Fe, B, C, Nb, and Ni that forms an easy-to-weld target alloy 106, when welded with a hard-to-weld base alloy 101 having Ti greater than 2% by weight and more than 45% gamma prime in volume fraction.

In one embodiment, the hard-to-weld alloy 101 according to the present disclosure may include a composition, by weight, of about 3.5-4.3% tungsten, about 9.0-10% cobalt, about 13.7-14.3% chromium, about 2.8-3.9% aluminum, about 2.4-3.6% tantalum, about 3.4-5.1% titanium, about 1.4-1.7% molybdenum, about 0.35% of iron, about 0.005-0.02% of boron, about 0.08-0.12% carbon, about 0-1.75% niobium and a balance of nickel.

In one embodiment, the easy-to-weld alloy 106 according to the present disclosure may include a composition, by weight, of about 1.3-2.2% tungsten, about 18.5-19.5% cobalt, about 20.5-22.8% chromium, about 1.6-2.65% aluminum, about 0.95-2.4% titanium, about 0.9-1.1% molybdenum, about 0.35% of iron, about 0.002-0.01% of boron, about 0.08-0.15% carbon, about 1.25-4.75% niobium and a balance of nickel.

In one embodiment, the filler additive 102, according to the present disclosure, may include tungsten, by weight, about 0.05-2.0%, about 0.1-1.9%, about 0.25-1.25%, about 0.5-1.5%, or about 1%, including increments, intervals, and sub-range therein.

In one embodiment, the filler additive 102, according to the present disclosure, may include cobalt, by weight, about 20-26%, about 21-25%, about 22-24%, or about 23%, including increments, intervals, and sub-range therein.

In one embodiment, the filler additive 102, according to the present disclosure, may include chromium, by weight, about 20-35%, about 22-33%, about 24-31%, or about 26-29%, including increments, intervals, and sub-range therein.

In one embodiment, the filler additive 102, according to the present disclosure, may include aluminum, by weight, about 0.5-3.5%, about 1-3%, about 1.5-2.5%, or about 2%, including increments, intervals, and sub-range therein.

In one embodiment, the filler additive 102, according to the present disclosure, may include titanium, by weight, about 0-2.5%, about 0.5-2%, or about 1-1.5%, including increments, intervals, and sub-range therein.

In one embodiment, the filler additive 102, according to the present disclosure, for molybdenum, may be, by weight, about 0-2.5%, about 0.5-2%, or about 1-1.5%, including increments, intervals, and sub-range therein.

In one embodiment, the filler additive 102, according to the present disclosure, may include iron, by weight, about 0-1.0%, about 0.25-0.75%, or about 0.5%, including increments, intervals, and sub-range therein.

In one embodiment, the filler additive 102, according to the present disclosure, may include boron, by weight, about 0-0.02%, about 0.005-0.015%, or about 0.01%, including increments, intervals, and sub-range therein.

In one embodiment, the filler additive 102, according to the present disclosure, may include carbon, by weight, about 0.01-0.15%, or about 0.005-0.01%, or about 0.01%, including increments, intervals, and sub-range therein.

In one embodiment, the filler additive 102, according to the present disclosure, may include niobium, by weight, about 1.0-8.0%, about 2.0-7.0%, about 3.0-6.0%, or about 4.0-5.0%, including increments, intervals, and sub-range therein.

In one embodiment, the filler additive 102, according to the present disclosure, may include a balance of nickel.

In one embodiment, the filler additive 102 may include a sufficient amount of each of W, Co, Cr, Al, Ti, Mo, Fe, B, C, Nb, and Ni that forms an easy-to-weld target alloy 106 comprising, by weight, about 0.05-2.0% of tungsten, about 20-26% of cobalt, about 20-35% of chromium, 0.5-3.5% of aluminum, about 0-2.5% of titanium, about 0-2.5% of molybdenum, about 0-1.0% of iron, about 0-0.02% of boron, about 0.01-0.15% of carbon, about 1.0-4.0% of niobium, and a balance of nickel.

In another embodiment, the filler additive 102 may include a sufficient amount of each of W, Co, Cr, Al, Ti, Mo, Fe, B, C, Nb, and Ni that forms an easy-to-weld target alloy 106 comprising, by weight, about 0.05-2.0% of tungsten, about 20-26% of cobalt, about 20-35% of chromium, 0.5-3.5% of aluminum, about 0-2.5% of titanium, about 0-2.5% of molybdenum, about 0-1.0% of iron, about 0-0.02% of boron, about 0.01-0.15% of carbon, about 4.0-8.0% of niobium, and a balance of nickel.

Using the same method stated above, it is also possible to obtain another novel composition of filler additive to form the easy-to-weld target alloy including a composition, by weight, of about 1.8-2.2% tungsten, about 18.5-19.5% cobalt, about 22.2-22.8% chromium, about 1.6-1.8% aluminum, about 2.2-2.4% titanium, about 0.15% molybdenum, about 0.35% of iron, about 0.002-0.008% of boron, about 0.08-0.12% carbon, about 1.25-1.45% niobium and a balance of nickel, or an alloy including a composition, by weight, of about 1.3-1.6% tungsten, about 18.5-19.5% cobalt, about 20.5-21.1% chromium, about 2.55-2.65% aluminum, about 0.95-1.05% titanium, about 0.9-1.1% molybdenum, about 0.35% of iron, about 0-0.01% of boron, about 0.12-0.15% carbon, about 4.65-4.75% niobium and a balance of nickel, when welded with a hard-to-weld base alloy having Ti greater than 2% by weight, such as GTD 111 including a composition, by weight, of about 3.5-4.1% tungsten, about 9-10% cobalt, about 13.7-14.3% chromium, about 2.8-3.2% aluminum, about 2.4-3.1% of tantalum, about 4.7-5.1% titanium, about 1.4-1.7% molybdenum, about 0.35% of iron, about 0.005-0.02% of boron, about 0.08-0.12% of carbon and a balance of nickel or a GTD111's serial alloy including a composition, by weight, of about 4.0-4.3% tungsten, about 9.0-9.9% cobalt, about 13.7-14.3% chromium, about 3.5-3.9% aluminum, about 3.6% of tantalum, about 3.4-3.8% titanium, about 1.4-1.7% molybdenum, about 0.35% of iron, about 0.005-0.02% of boron, about 0.08-0.12% of carbon and a balance of nickel.

In one embodiment, the filler additive 102 may include a composition, by weight, of about 0.05-2.0% of tungsten, about 20-26% of cobalt, about 20-35% of chromium, 0.5-3.5% of aluminum, about 0-2.5% of titanium, about 0-2.5% of molybdenum, about 0-1.0% of iron, about 0-0.02% of boron, about 0.01-0.15% of carbon, about 1.0-4.0% of niobium, and a balance of nickel.

In another embodiment, the filler additive 102 may include a composition, by weight, of about 0.05-2.0% of tungsten, about 20-26% of cobalt, about 20-35% of chromium, 0.5-3.5% of aluminum, about 0-2.5% of titanium, about 0-2.5% of molybdenum, about 0-1.0% of iron, about 0-0.02% of boron, about 0.01-0.15% of carbon, about 4.0-8.0% of niobium, and a balance of nickel.

In another embodiment, the filler additive 102 may include a composition, by weight, of about 1.05-1.40% of tungsten, about 22.55-24.0% of cobalt, about 25.80-26.45% of chromium, 1.05-1.20% of aluminum, about 1.10-1.25% of titanium, about 0-0.35% of iron, about 0.08-0.10% of carbon, about 1.75-2.10% of niobium, and a balance of nickel.

In another embodiment, the filler additive 102 may include a composition, by weight, of about 0.35-0.55% of tungsten, about 22.55-23.60% of cobalt, about 23.40-24.05% of chromium, 2.40-2.45% of aluminum, about 0.65-0.85% of molybdenum, about 0-0.35% of iron, about 0-0.01% of boron, about 0.08-0.10% of carbon, about 6.60-6.80% of niobium, and a balance of nickel.

In another embodiment, the filler additive 102 may include a composition, by weight, of about 0.85-1.30% of tungsten, about 22.55-23.65% of cobalt, about 25.80-26.45% of chromium, 0.75-0.90% of aluminum, about 1.65-1.80% of titanium, about 0-0.35% of iron, about 0.01-0.11% of boron, about 0.08-0.12% of carbon, about 1.10-1.35% of niobium, and a balance of nickel.

In another embodiment, the filler additive 102 may include a composition, by weight, of about 0.10-0.45% of tungsten, about 22.55-23.65% of cobalt, about 23.40-24.05% of chromium, 2.10-2.15% of aluminum, about 0.65-0.85% of molybdenum, about 0-0.35% of iron, about 0-0.01% of boron, about 0.08-0.13% of carbon, about 5.95-6.05% of niobium, and a balance of nickel.

In an embodiment, the filler additive 102 is a nickel-based alloy. The filler additive 102 may be fabricated into a powder, stick, wire, rod or a combination thereof.

In one embodiment, the hard-to-weld base alloy 101 may include a composition, by weight, of about 3.5-4.1% tungsten, about 9-10% cobalt, about 13.7-14.3% chromium, about 2.8-3.2% aluminum, about 2.4-3.1% of tantalum, about 4.7-5.1% titanium, about 1.4-1.7% molybdenum, about 0.35% of iron, about 0.005-0.02% of boron, about 0.08-0.12% of carbon and a balance of nickel.

In another embodiment, the hard-to-weld base alloy 101 may include a composition, by weight, of about 4.0-4.3% tungsten, about 9.0-9.9% cobalt, about 13.7-14.3% chromium, about 3.5-3.9% aluminum, about 3.6% of tantalum, about 3.4-3.8% titanium, about 1.4-1.7% molybdenum, about 0.35% of iron, about 0.005-0.02% of boron, about 0.08-0.12% of carbon, about 1.55-1.75% of niobium and a balance of nickel In another embodiment, the hard-to-weld base alloy 101 may be GTD 111 or its serial alloys.

In one embodiment, the easy-to-weld target alloy 106 may include, by weight, about 1.8-2.2% tungsten, about 18.5-19.5% cobalt, about 22.2-22.8% chromium, about 1.6-1.8% aluminum, about 2.2-2.4% titanium, about 0.15% molybdenum, about 0.35% of iron, about 0.002-0.008% of boron, about 0.08-0.12% carbon, about 1.25-1.45% niobium and a balance of nickel.

In another embodiment, the easy-to-weld target alloy 106 may include, by weight, about 1.3-1.6% tungsten, about 18.5-19.5% cobalt, about 20.5-21.1% chromium, about 2.55-2.65% aluminum, about 0.95-1.05% titanium, about 0.9-1.1% of molybdenum, about 0.35% of iron, about 0-0.01% of boron, about 0.12-0.15% carbon, about 4.65-4.75% niobium and a balance of nickel.

Figure 2:
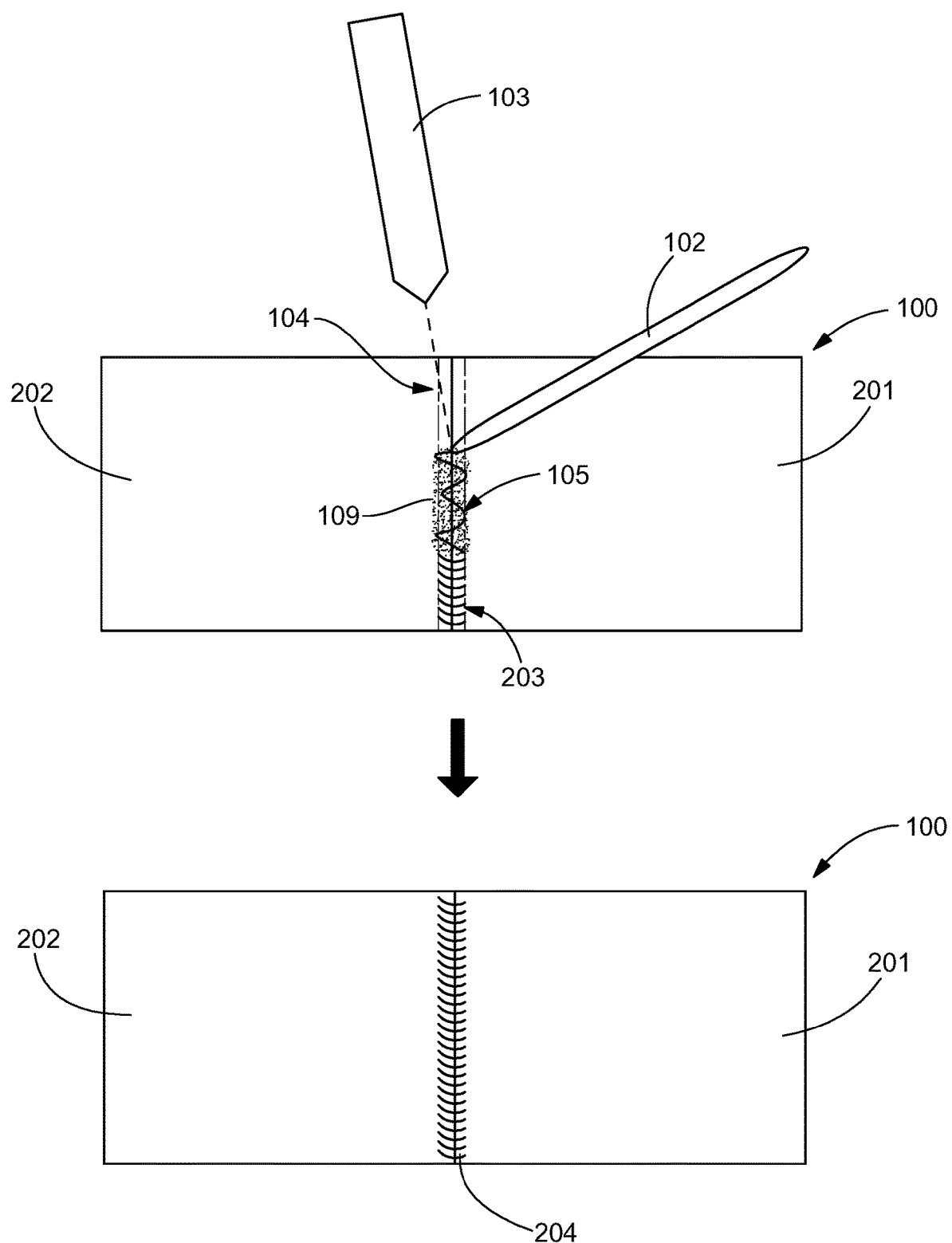
FIG. 2 illustrates a method, according to an alternate embodiment of the present disclosure.

With reference to FIG. 2, a component 100 is provided. The component 100 includes a first hard-to-weld base alloy 201 and second hard-to-weld base alloy 202. An energy source 103 is arranged to provide energy to melt a portion of filler additive 102 and a portion of the first hard-to-weld base alloy 201 and the second hard-to-weld base alloy 202. A melted portion 105 from the molten mix zone 109 of the filler additive 102 and the hard-to-weld base alloys 201 and 202 forms a layer of target alloy 204 to create a fusion line 203 between the hard-to-weld base alloys 201 and 202. In one embodiment, the treated component 100 is crack-free weld metal.

In an embodiment, the first hard-to-weld base alloy 201 may include a material that is the same as a material of the second hard-to-weld base alloy 202. In another embodiment, the base alloy includes a material that is dissimilar from a material of the second hard-to-weld base alloy 202. The first hard-to-weld base alloy 201 may be GTD 111 or its serial alloys. The second hard-to-weld base alloy 202 may be GTD 111 or its serial alloys.

In one embodiment, a method includes the step of welding the component with a filler additive comprising a sufficient amount of each of W, Co, Cr, Al, Ti, C, Nb, and Ni, the component including a base alloy. The method further includes the step of forming a target alloy on a surface of the component from the welding. In an embodiment, the filler additive may be fusion welded with the hard-to-weld base alloy to form the easy-to-weld target alloy. The easy-to-weld target alloy may be welded with the base alloy and the filler additive using a gas tungsten arc welding process or a laser welding process plus additive powder or filler. The method further includes the step of applying an alloy to the surface to fill the weld groove and finish welding process, wherein the alloy is selected from the group consisting of an additional target alloy, another filler additive, and combinations thereof.

In some embodiments, a weld filler additive is buttered to a base hard-to-weld alloy to create a layer of an easy-to-weld alloy so that additional easy-to-weld or hard-to-weld alloy can be welded onto the layer formed from the buttering with the filler additive to fill in a treatment area.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A weld filler additive that forms an easy-to-weld target alloy when welded with a hard-to-weld base alloy having Ti greater than 2% by weight and gamma prime greater than 40% volume fraction, the weld filler additive being an alloy comprising, by weight:

1.05-1.40% of tungsten, 22.55-24.0% of cobalt, 25.80-26.45% of chromium, 1.05-1.20% of aluminum, 1.10-

1.25% of titanium, 0-0.35% of iron, 0.08-0.10% of carbon, 1.75-2.10% of niobium, and a balance of nickel, or 0.35-0.55% of tungsten, 22.55-23.60% of cobalt, 23.40-24.05% of chromium, 2.40-2.45% of aluminum, 0.65-0.85% of molybdenum, 0.35% of iron, 0-0.01% of boron, 0.08-0.10% of carbon, 6.60-6.80% of niobium, and a balance of nickel.

2. The weld filler additive according to claim 1, wherein the easy-to-weld target alloy comprises, by weight, 1.8-2.2% tungsten, 18.5-19.5% cobalt, 22.2-22.8% chromium, 1.6-1.8% aluminum, 2.2-2.4% titanium, 0.15% molybdenum, 0.35% of iron, 0.002-0.008% of boron, 0.08-0.12% carbon, 1.25-1.45% niobium, and a balance of nickel.

3. The weld filler additive according to claim 1, wherein the easy-to-weld target alloy comprises, by weight, 1.3-1.6% tungsten, 18.5-19.5% cobalt, 20.5-21.1% chromium, 2.55-2.65% aluminum, 0.95-1.05% titanium, 0.9-1.1% of molybdenum, 0.35% of iron, 0-0.01% of boron, 0.12-0.15% carbon, 4.65-4.75% niobium, and a balance of nickel.

4. The weld filler additive according to claim 1, wherein the hard-to-weld base alloy comprises, by weight, 3.5-4.1% tungsten, 9-10% cobalt, 13.7-14.3% chromium, 2.8-3.2% aluminum, 2.4-3.1% of tantalum, 4.7-5.1% titanium, 1.4-1.7% molybdenum, 0.35% of iron, 0.005-0.02% of boron, 0.08-0.12% of carbon, and a balance of nickel.

5. The weld filler additive according to claim 1, wherein the hard-to-weld base alloy comprises, by weight, 4.0-4.3% tungsten, 9.0-9.9% cobalt, 13.7-14.3% chromium, 3.5-3.9% aluminum, 3.6% of tantalum, 3.4-3.8% titanium, 1.4-1.7% molybdenum, 0.35% of iron, 0.005-0.02% of boron, 0.08-0.12% of carbon, 1.55-1.75% of niobium, and a balance of nickel.

6. The weld filler additive according to claim 1, wherein the weld filler additive is in a form selected from the group consisting of powder, stick, wire, rod, and combinations thereof.

7. A method of welding a component, the method comprising:
   welding the component with a weld filler additive, the component including a hard-to-weld base alloy having Ti greater than 2% by weight and gamma prime greater than 40% volume fraction; and
   forming an easy-to-weld target alloy on a surface of the component from the welding of the hard-to weld base alloy with the weld filler additive,
   wherein the weld filler additive is an alloy comprising, by weight, 0.05-2.0% of tungsten, 20-26% of cobalt, 20-35% of chromium, 0.5-3.5% of aluminum, 0-2.5% of titanium, 0-2.5% of molybdenum, 0-1.0% of iron, 0-0.02% of boron, 0.01-0.15% of carbon, 1.0-8.0% of niobium and a balance of nickel.

8. The method according to claim 7, wherein the weld filler additive is an alloy comprising, by weight, 1.05-1.40% of tungsten, 22.55-24.0% of cobalt, 25.80-26.45% of chromium, 1.05-1.20% of aluminum, 1.10-1.25% of titanium, 0-0.35% of iron, 0.08-0.10% of carbon, 1.75-2.10% of niobium, and a balance of nickel.

9. The method according to claim 7, wherein the weld filler additive is an alloy comprising, by weight, 0.35-0.55% of tungsten, 22.55-23.60% of cobalt, 23.40-24.05% of chromium, 2.40-2.45% of aluminum, 0.65-0.85% of molybdenum, 0.35% of iron, 0-0.01% of boron, 0.08-0.10% of carbon, 6.60-6.80% of niobium, and a balance of nickel.

10. The method according to claim 7, wherein the easy-to-weld target alloy comprises, by weight, 1.8-2.2% tungsten, 18.5-19.5% cobalt, 22.2-22.8% chromium, 1.6-1.8% aluminum, 2.2-2.4% titanium, 0.15% molybdenum, 0.35% of iron, 0.002-0.008% of boron, 0.08-0.12% carbon, 1.25-1.45% niobium, and a balance of nickel.

11. The method according to claim 7, wherein the easy-to-weld target alloy comprises, by weight, 1.3-1.6% tungsten, 18.5-19.5% cobalt, 20.5-21.1% chromium, 2.55-2.65% aluminum, 0.95-1.05% titanium, 0.9-1.1% of molybdenum, 0.35% of iron, 0-0.01% of boron, 0.12-0.15% carbon, 4.65-4.75% niobium, and a balance of nickel.

12. The method according to claim 7, wherein the hard-to-weld base alloy comprises, by weight, 3.5-4.1% tungsten, 9-10% cobalt, 13.7-14.3% chromium, 2.8-3.2% aluminum, 2.4-3.1% of tantalum, 4.7-5.1% titanium, 1.4-1.7% molybdenum, 0.35% of iron, 0.005-0.02% of boron, 0.08-0.12% of carbon, and a balance of nickel.

13. The method according to claim 7, wherein the hard-to-weld base alloy comprises by weight, 4.0-4.3% tungsten, 9.0-9.9% cobalt, 13.7-14.3% chromium, 3.5-3.9% aluminum, 3.6% of tantalum, 3.4-3.8% titanium, 1.4-1.7% molybdenum, 0.35% of iron, 0.005-0.02% of boron, 0.08-0.12% of carbon, 1.55-1.75% of niobium, and a balance of nickel.

14. The method according to claim 7, wherein the easy-to-weld target alloy is welded with the hard-to-weld base alloy and the weld filler additive using a gas tungsten arc welding process or a laser welding process plus additive powder or filler.

15. The method according to claim 7, wherein the weld filler additive is in a form selected from the group consisting of powder, stick, wire, rod, and combinations thereof.

16. The method according to claim 7, further comprising applying an additional target alloy, an additional weld filler additive, or both an additional target alloy and an additional weld filler additive to the surface to fill a weld groove.

* * * * *